Patented Mar. 5, 1946

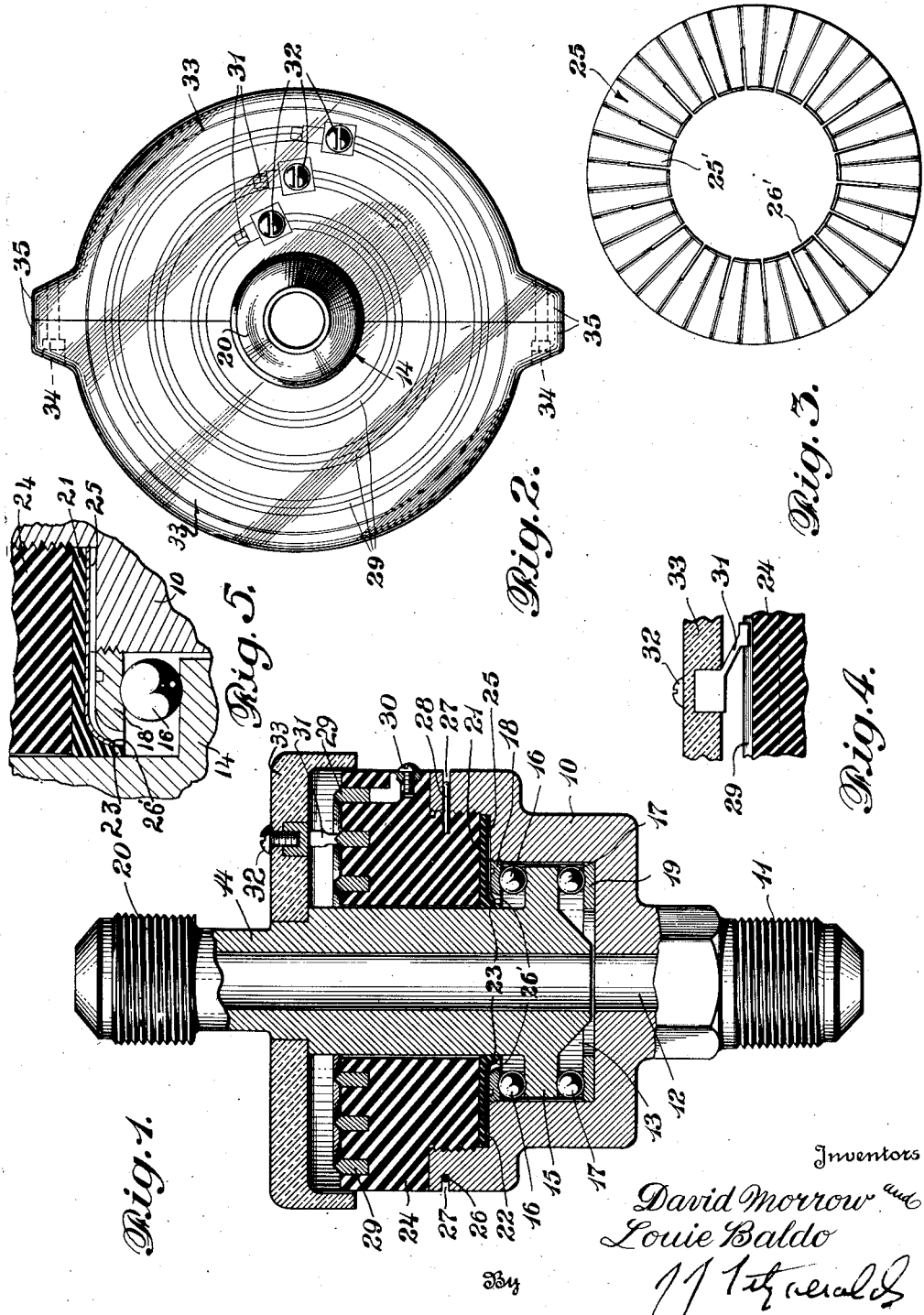

2,395,899

UNITED STATES PATENT OFFICE 2,395,899

SWIVEL CONNECTION FOR AIRCRAFT TURRETS

David Morrow and Louie Baldo, United States Navy

Application November 13, 1943, Serial No. 510,253

3 Claims. (Cl. 174—21)

(Granted under the act of March 3, 1883, as amended April 30, 1928; 370 O. G. 757)

This invention relates to swivel connections for aircraft turrets and it has for its principal object the provision of a swivel of the type described for maintaining the oxygen supply and interphone connections to the gunner or other crewman in an aircraft turret when the turret is rotated in combat without fouling or twisting the oxygen supply line or the interphone wires leading thereto.

With such objects in view, as well as other advantages which may be incident to the use of the improvements, the invention consists of the parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawing, means for carrying the invention into practical effect, without limiting the improvements in their useful application to the particular constructions and arrangements which, for the purpose of explanation, have been made the subject of illustration.

In the accompanying drawing:

Fig. 1 is a view partly in side elevation and partly in vertical section of a swivel connection constructed in accordance with the invention;

Fig. 2 is a plan view of the structure shown in Fig. 1;

Fig. 3 is a plan view of the spring washer forming part of the sealing; and

Fig. 4 is a fragmentary view of one of the brushes of the interphone system.

Fig. 5 is an enlarged sectional view showing a portion of the structure of Fig. 1.

Referring to the drawing, a swivel connection embodying the present invention is shown as comprising a main body member 10 which is adapted to be connected to the aircraft frame structure and is provided with a screw threaded nipple 11 which is formed with an axial bore 12 for establishing communication between a source of oxygen supply and a chamber 13 formed in the body member 10. A tubular member 14 is rotatably mounted in the body member 10 and is provided with an annular flange 15 at its lower end which is supported between upper and lower ball bearings 16 and 17 respectively. The ball bearings 16 and 17 ride upon upper and lower raceways 18 and 19 of hardened steel, the upper raceway 18 being threaded into the chamber 13 so as to maintain the tubular member 14 and the bearing elements against vertical displacement. The upper end of the tubular member 14 is provided with a screw threaded nipple 20 for connection with the oxygen line leading to the mask of the occupant of the turret and is disposed in co-axial relation to the turret for rotation therewith.

The leakage of oxygen from the chamber 13 around the rotatable member 14 is prevented by a gasket 21 of rubber or rubber like material having the proper low temperature characteristics. This gasket is mounted on a seat 22 formed on the body member 10 and is formed with a depending lip or flange 23 engageable with the rotatable member 14 and held in sealing contact therewith by the pressure of the oxygen in the chamber 13. The gasket is held in position by a collar member 24 of plastic or other suitable insulating material and a fluted or corrugated metallic washer 25, the gasket being interposed therebetween. The inner circumferential portion of the spring washer 25 is split radially at intervals so as to form a plurality of inwardly projecting fingers 25' the inner extremities of which are bent downwardly as at 26' for resilient engagement with the lip or flange 23 of the gasket 21 to augment its pressure against the member 14. The member 24 is prevented from unscrewing by a spring clip 26 engageable in an annular groove 27 formed in the body 10 and having an inwardly bent extremity 28 engageable with a drilled opening in the member 24.

Molded into the upper face of the insulating member 24 are three slip rings 29 each being provided with an inlet terminal 30 adapted to be connected with the interphone system of the aircraft, and each adapted to be engaged by a brush 31 having an outlet terminal 32 adapted to be connected with the wires leading to the headphones of the crewman. The brushes 31 are carried by and preferably molded into a two-part insulating cap piece 33 which is clamped around the rotatable member 14 by screws 34 engageable with ears or lugs 35 formed on the cap piece (Fig. 2).

From the foregoing it will be apparent that as the turret is rotated the oxygen supply pipe and the interphone connections leading to the mask and headphones of the crewman will rotate with it without becoming twisted or fouled or otherwise becoming entangled or broken.

It will be understood, as previously stated that the above description and accompanying drawing comprehends only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

We claim:

1. A swivel connection for aircraft turrets comprising a body member having a chamber formed therein and adapted to be fixed to the frame structure of the aircraft and having a nipple adapted to be connected with a source of oxygen supply, said nipple having a bore communicating with said chamber, a tubular member rotatably mounted in said chamber in communication with said bore and adapted to be fixed to a rotatable turret of said aircraft for fluid communication with the oxygen mask of the occupant of said turret, said tubular member having a flange thereon, an insulating collar fixed to said body member and closing said chamber and overlying said flange and maintaining said tubular member from displacement from said chamber, a plurality of slip rings carried by said collar and adapted to be connected with the interphone system of the aircraft, an insulating cap piece secured to said tubular member for rotation therewith, a plurality of brushes carried by said cap piece for electrical contact with said slip rings and adapted to be connected with the headphones of the occupant of said turret, and a flexible gasket clamped between said body member and said collar and extending into sealing engagement with said tubular member for preventing the escape of oxygen therearound.

2. A swivel connection for aircraft turrets comprising a body member having a chamber formed therein and adapted to be fixed to the frame structure of the aircraft and having a nipple adapted to be connected with a source of oxygen supply, said nipple having a bore communicating with said chamber a tubular member rotatably mounted in said chamber in communication with said bore and adapted to be fixed to a rotatable turret of said aircraft for fluid communication with the oxygen mask of the occupant of said turret, said tubular member having a flange thereon, an insulating collar fixed to said body member and closing said chamber and overlying said flange and maintaining said tubular member from displacement from said chamber, a plurality of slip rings carried by said collar and adapted to be connected with the interphone system of the aircraft, an insulating cap piece secured to said tubular member for rotation therewith a plurality of brushes carried by said cap piece for electrical contact with said slip rings and adapted to be connected with the headphones of the occupant of said turret, a flexible gasket clamped between said body member and said collar and extending into engagement with said tubular member and having a depending annular flange adapted to be held in sealing contact with said tubular member by the pressure of oxygen in said chamber for preventing the escape of oxygen around said tubular member, and a metallic washer clamped between said body member and said gasket and having a plurality of depending spring fingers formed around its inner circumference for engagement with the depending flange on said gasket to augment its pressure against said tubular member.

3. A swivel connection for aircraft turrets comprising a body member having a chamber formed therein and adapted to be fixed to the frame structure of the aircraft and having a nipple adapted to be connected with a source of oxygen supply, said nipple having a bore communicating with said chamber a tubular member rotatably mounted in said chamber in communication with said bore and adapted to be fixed to a rotatable turret of said aircraft for fluid communication with the oxygen mask of the occupant of said turret, said tubular member having a flange thereon, an insulating collar having a screw threaded connection within said body member and closing said chamber and overlying said flange and maintaining said tubular member from displacement from said chamber, a plurality of slip rings carried by said collar and adapted to be connected with the interphone system of the aircraft, an insulating cap piece secured to said tubular member for rotation therewith, a plurality of brushes carried by said cap piece for electrical contact with said slip rings and adapted to be connected with the headphones of the occupant of said turret, a flexible gasket clamped between said body member and said collar and extending into sealing engagement with said tubular member for preventing the escape of oxygen therearound, said body member having an annular groove therein and an opening through its wall leading from said annular groove, said collar having an opening therein for alignment with the opening in the body member, and removable means preventing the collar member from unscrewing comprising a spring clip disposed in said annular groove and having an inwardly bent extremity extending into the aligned openings in the body member and collar.

DAVID MORROW.
LOUIE BALDO.